United States Patent
Hobbs et al.

(10) Patent No.: US 8,300,760 B2
(45) Date of Patent: Oct. 30, 2012

(54) COMPRESSED POWDER COMPOSITE NEUTRON ABSORBER MATERIAL

(75) Inventors: James S. Hobbs, Norcross, GA (US);
Alan H. Wells, Duluth, GA (US);
Laurence Danese, Atlanta, GA (US)

(73) Assignee: Neucon Technology, LLC, Atlanta, GA (US)

( * ) Notice: Subject to any disclaimer, the term of this patent is extended or adjusted under 35 U.S.C. 154(b) by 1040 days.

(21) Appl. No.: 12/246,256

(22) Filed: Oct. 6, 2008

(65) Prior Publication Data

US 2011/0168926 A1    Jul. 14, 2011

Related U.S. Application Data

(63) Continuation-in-part of application No. 11/617,160, filed on Dec. 28, 2006, now abandoned.

(60) Provisional application No. 60/754,754, filed on Dec. 29, 2005.

(51) Int. Cl.
*G21F 5/00* (2006.01)
*G21C 7/00* (2006.01)
*G21C 3/00* (2006.01)

(52) U.S. Cl. ........ 376/327; 376/409; 376/419; 376/423; 376/337; 250/506.1; 250/507.1

(58) Field of Classification Search .................. 376/327, 376/409, 419, 423, 337; 250/506.1, 507.1
See application file for complete search history.

(56) References Cited

U.S. PATENT DOCUMENTS

| 4,320,204 | A | * | 3/1982 | Weaver | 501/91 |
| 4,476,394 | A | | 10/1984 | Muller et al. | |
| 4,781,883 | A | | 11/1988 | Daugherty et al. | |
| 4,827,139 | A | | 5/1989 | Wells et al. | |
| 4,894,088 | A | * | 1/1990 | Yamaguchi et al. | 75/232 |
| 2007/0064860 | A1 | * | 3/2007 | Kusui et al. | 376/333 |

FOREIGN PATENT DOCUMENTS

JP         06186373 A  *  7/1994

OTHER PUBLICATIONS

Lange, "The Sintinering Kinetics of Pure and Doped Boron Carbide", proceedings of Fifth International Conference on Sintering and Related Phenomena, University of Notre Dame, South Bend, Indiana., Jun. 18-20, 1979, pp. 1-35.*

* cited by examiner

*Primary Examiner* — Erin M Leach
(74) *Attorney, Agent, or Firm* — Rodgers & Rodgers

(57) ABSTRACT

A compressed powder composite (CPC) material for absorbing neutrons emitted from spent nuclear fuel thereby preventing the initiation of a chain reaction. The CPC material is typically provided as a substantially insoluble cylindrical pellet that is highly resistant to corrosion and is not subject to the failure modes associated with the alloy materials typically used in neutron absorption materials. The pellet preferably includes a dendritic nickel powder substantially uniformly mixed with a neutron absorber powder material, preferably boron carbide. Tubes filled with CPC materials, such tubes for replacing control roads so that a spent nuclear fuel assembly may be disposed of substantially indefinitely.

9 Claims, 5 Drawing Sheets

COMPRESSED POWDER COMPOSITE NEUTRON ABSORBER MATERIAL

CROSS REFERENCE TO RELATED APPLICATION

This is a continuation-in-part application claiming benefit of U.S. Nonprovisional application Ser. No. 11/617,160 filed Dec. 28, 2006 now abandoned, and entitled Metal-Matrix Composite Neutron Absorber Material for Transportation, Aging, and Disposal (TAD) Spent Fuel Canisters, incorporated herein by reference in its entirety, which further claimed priority to U.S. Provisional Application Ser. No. 60/754,754 filed Dec. 29, 2005, and entitled, Metal-Matrix Composite Neutron Absorber Material for Transportation, Aging, and Disposal (TAD) Spent Fuel Canisters, incorporated herein by reference in its entirety.

FIELD

Embodiments of the invention relate to the field of nuclear criticality control materials (neutron absorbing materials) and methods. More particularly, embodiments of the invention relate to the materials designed for criticality control of Pressurized Water Reactor (PWR) nuclear fuel in Transportation, Aging, and Disposal (TAD) Spent Fuel Canisters as envisioned by the United States Department of Energy for spent fuel disposal.

BACKGROUND

There are over 100 nuclear power plants in operation in the United States, most of which are Pressurized Water Reactor (PWR) designs. These plants generate approximately 20% of the electricity used in the United States. The reactors operate using fuel made from uranium (U) enriched in the fissile U-235 isotope. The maximum initial U-235 enrichment in new fuel is generally slightly less than 5% (the amount of U-235 in naturally occurring uranium is 0.071%). During its lifetime, the uranium is typically burned to a final enrichment of slightly more than 1.0%. At the end of its useful lifetime in a reactor, the spent nuclear fuel (SNF) is stored temporarily in water pools or in dry canisters and casks. It is possible that some SNF can contain sufficient unburned fissile material that, in the presence of water, an array of SNF assemblies could theoretically experience criticality (i.e., a sustained nuclear chain reaction). Although it is extremely unlikely that a chain reaction would occur, to insure that criticality does not occur, the structures that hold the SNF in spent fuel pools and dry storage canisters and casks are designed and built with criticality control features, including SNF positional or geometry control and neutron absorbing materials, that prevent spontaneous criticality from occurring.

There are a number of spent fuel containment technologies approved by the U.S. Nuclear Regulatory Commission (US-NRC) and there are many SNF storage systems in safe operation. Most of the dry storage canisters and casks are designed and licensed as dual-purpose systems (i.e., for storage and transportation). The U.S. Department of Energy (DOE) has issued a specification for a type of canister that can be used not only for storage and transportation, but also for disposal in a geologic repository. The new canister is called the Transportation, Aging, and Disposal (TAD) package. The conceptual design of the TAD package is based on installing a canister inside different overpacks for the transportation, storage, and disposal activities. The TAD canister and internal components remain the same in all of these activities. The specification calls out borated stainless steel plates as the neutron absorber material to be used inside the canister. The specification also defines a 10,000-year design lifetime.

There will be at least three barriers to protect the spent fuel in the repository—the canister overpack, the TAD canister shell, and the fuel cladding (typically Zircaloy). In the DOE TAD design, each fuel assembly is surrounded on all four sides by a borated stainless steel plate. A basket structure is designed to hold the borated stainless steel plates in place and create a neutron flux trap between the absorber plates to increase the effectiveness of the neutron absorber. A design requirement of the TAD specification for the neutron absorber material is that the material have sufficient corrosion resistance that the absorber effectiveness is maintained after exposure to groundwater for a period of 10,000 years. The borated stainless steel plates meet this requirement by having a thickness that includes a corrosion allowance. It is postulated that over thousands or tens of thousands of years, these barriers will be breached by corrosion from groundwater, and the groundwater will penetrate the TAD canister. The presence of groundwater in the TAD canister provides moderation of the neutrons in the system and could lead to criticality, if there is insufficient criticality control in the form of neutron absorbing material.

Accordingly, there is a need for a neutron absorbing material that will assure that the SNF maintains subcriticality after the degradation of the multiple barriers and the ingress of groundwater into the TAD canister.

SUMMARY

The above and other needs are met by an apparatus for absorbing neutrons emitted from spent nuclear fuel, the apparatus including a compressed powder composite (CPC) material including nickel powder and neutron absorbing material powder being substantially mixed together and mechanically bonded together but not chemically bonded together so that the respective corrosion rates of the nickel and neutron absorbing material making up the CPC material remain substantially unchanged. In a preferred embodiment, the CPC material includes a concentration of neutron absorber material by mass ranging from about 10% to about 3%. Preferably, the neutron absorbing material includes gadolinium phosphate, boron carbide, and/or mixtures thereof. Preferably, the compressed nickel powder includes a compressed powder such as substantially pure dendritic nickel, substantially pure non-dendritic nickel metal, and/or combinations thereof.

In a preferred embodiment, the CPC material is shaped in the form of a cylindrical pellet. Such pellet preferably includes a length ranging from about 0.5 inches to about 0.9 inches, and a diameter ranging from about 0.3 inches to about 0.5 inches.

In a related embodiment, the apparatus includes one or more of the cylindrical pellets described above located within a substantially sealed elongate absorber tube preferably having a length ranging from about 5 feet to about 13 feet. If more than one pellet is used in the absorber tube, the pellets are preferably located in a stacked configuration (preferably single file), wherein the absorber tube is configured for fitting within a guide tube of a Pressurized Water Reactor spent nuclear fuel assembly. In a preferred embodiment, the apparatus may further include a pair of biasing members within the absorber tube, a first biasing member located internally adjacent a first end of the absorber tube and a second biasing member located internally adjacent a second end of the absorber tube wherein the plurality of pellets are biased against one another so that substantially no gaps develop between the pellets. The absorber tube is preferably made from stainless steel and/or one or more zirconium alloys.

In another aspect, embodiments of the disclosure provide a method of manufacturing an apparatus for absorbing neutrons emitted from spent nuclear fuel such that substantially no alloy material is formed during the manufacturing process. The method includes the steps of (a) mixing a neutron absorbing material and a metal powder material to form a substantially uniform first mixture; (b) packing the first mixture to a first density and a first thickness in a containment structure; (c) heating the first mixture at a first temperature ranging from about 350 degrees Fahrenheit to about 450 degrees Fahrenheit for a first time period; and (d) compressing the first mixture at a first pressure ranging from about $1\times10^5$ lbs/in$^2$ to about $2\times10^5$ lbs/in$^2$ for a second time period to bring the first mixture to a second density and a second thickness. The neutron absorbing material and the metal powder material in step (a) preferably include a mixture consisting essentially of fine particulates. The metal powder material preferably includes dendritic nickel powder.

In one preferred embodiment, step (d) further includes a step (d)(1) including forming a compressed powder composite (CPC) pellet.

In another preferred embodiment, step (a) further includes the steps of (a)(1) including measuring a first amount of the first neutron absorbing material by weight and (a)(2) including measuring a first amount of the metal powder material by weight prior to mixing them together.

In a related embodiment, some or all of the embodiments of the method described above further include step (e) including inserting at least one CPC pellet into an elongate absorber tube. The method preferably further includes the step (f) including substantially sealing the CPC pellet within the absorber tube. The method preferably further includes the step (g) including inserting the tube within a guide tube in a nuclear fuel assembly.

In a related embodiment, some or all of the embodiments of the method described above further include step (e)' including trimming the compressed powder composite pellet.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Figure 1:
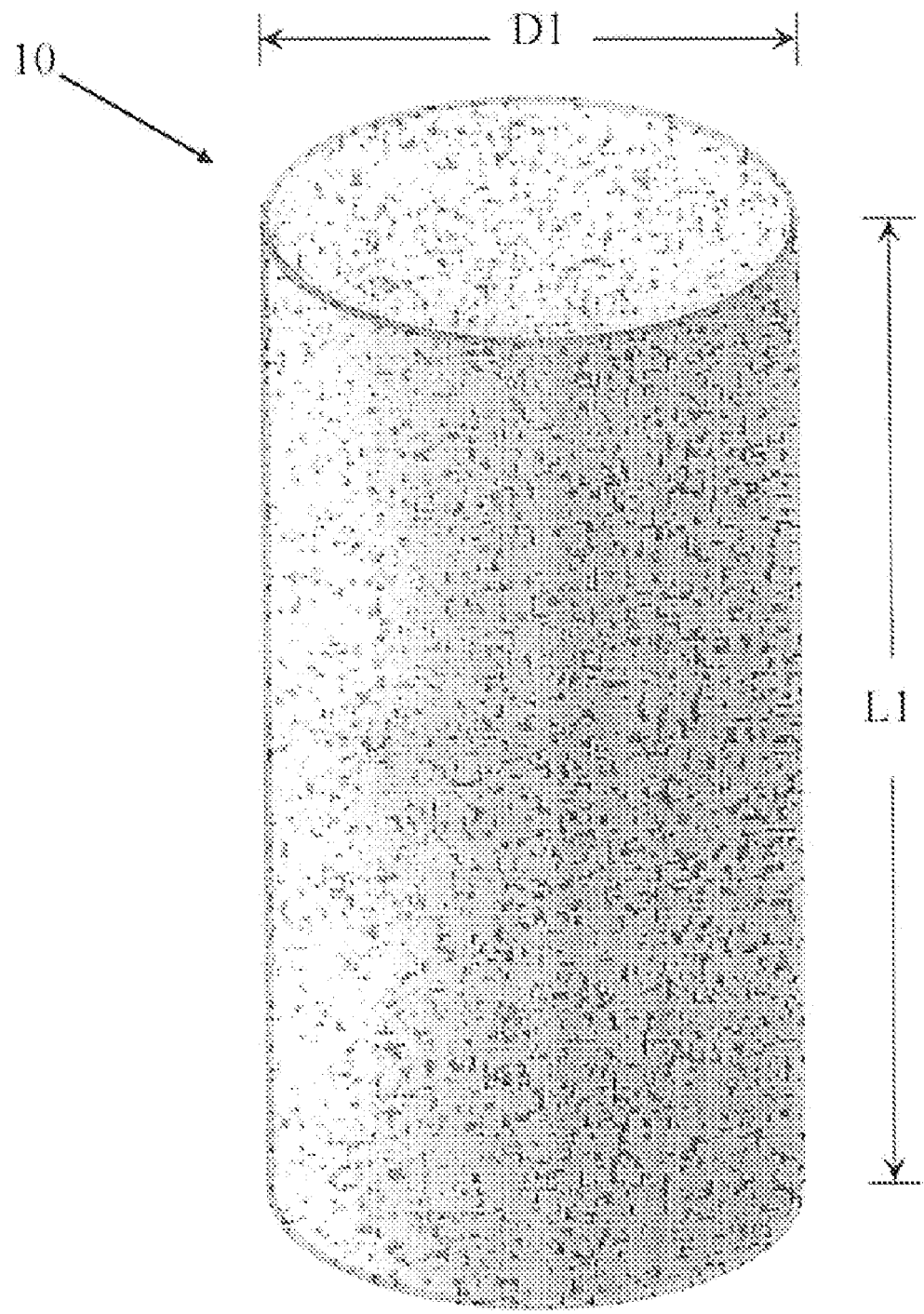
FIG. 1 shows a cylindrical compressed powder composite (CPC) pellet for absorbing neutrons.

FIG. 1 depicts a preferred embodiment of a compressed powder composite (CPC) structure 10, for absorbing neutrons and preventing the initiation of a neutron chain reaction. The CPC structure 10 includes nickel powder and neutron absorber powder compacted and compressed together to the desired dimensions and density. The CPC structure 10 includes a diameter D1 and a length L1 wherein the typical aspect ratio is 2:1 to facilitate insertion into an elongate structure such as, for example, a tube. The typical diameter D1 ranges from about 0.31 inches (7.9 mm) to about 0.45 inches (11.4 mm). The typical Length L1 ranges from about 0.6 inches (15.2 mm) to about 0.9 inches (22.9 mm).

The processes used to form the CPC structure 10 are controlled to limit the heat and pressure applied such that an alloy of the nickel and a neutron absorber, such as, for example, Ni$_2$B, is not formed. Avoiding the formation of an alloy is important to maintaining the intrinsic low corrosion rates and insolubility of the starting materials. The term "corrosion" as used herein is defined as deterioration of a substance primarily caused by the chemical influences associated with exposure of the substance to groundwater.

The neutron absorbing material is preferably boron carbide (B$_4$C). Alternatively or additionally, the neutron absorbing material may include gadolinium phosphate (GdPO$_4$). Both boron carbide and gadolinium phosphate are considered "insoluble" for the purposes of this disclosure. Solubility as referenced herein is to be interpreted as a substance being soluble in water (e.g., groundwater). Because radioactive decay is an event that occurs over tens of thousands of years, for the purposes of this disclosure, a substance is to be understood as "insoluble" if such substance substantially resists dissolution in water for 10,000 years or more. The corrosion rates of nickel, B$_4$C, and GdPO$_4$ at 26° C. in substantially neutral water are as follows: nickel, about 0.08 micrometers per year (i.e., about $8\times10^{-8}$ m/yr); B$_4$C, about 0.05 micrometers per year; GdPO$_4$, about 0.19 micrometers per year. For comparison, the corrosion rate of borated stainless steel in the same environment ranges from about 11 micrometers to about 94 micrometers per year. Thus, the preferred materials that make up the bulk of the CPC are about 100 times more corrosion resistant than borated stainless steel, which has been recommended for use in the U.S. Department of Energy's TAD canister specification. B$_4$C is preferably used, and in such preferred embodiment, the B$_4$C is present in a concentration preferably ranging from about 3 weight percent to about 10 weight percent, and more preferably about 5 weight percent of the total mixture. The concentration of neutron absorbing material may be tailored depending on the design requirements of a particular application, considering such factors as the initial enrichment of the nuclear fuel, its burnup or the arrangement of the SNF in the containment structure or basket. Those skilled in the art appreciate that there may be several different TAD designs for different types of SNF and these concentrations will vary depending on the specific design. The nickel powder material provides the balance of the total mixture. The nickel material is preferably substantially pure dendritic nickel powder. An example of nickel material used in certain embodiments of the invention is Inco® Type 123 PM nickel powder (T123 PM). T123 PM is a spherical nickel powder with a tightly controlled particle size and density optimized for the powder metallurgy industry. T123 PM is known for its high purity, fine size, uniform particle size, dendritic surface, and excellent compressibility. Dendritic materials are those having a sea urchin like appearance at the molecular level, wherein the spherical surface of the nickel is covered with spike like protrusions. These protrusions assist the mechanical bounding of the B$_4$C under pressure. Other nickel powder materials may be used in other embodiments of the disclosure, but substantially pure dendritic nickel powder is preferred.

In a related embodiment, the CPC structure 10 may also include a soluble neutron absorber such as boron oxide B$_2$O$_3$ wherein boron oxide powder is initially mixed with an insoluble neutron absorber powder and nickel powder. The three or more powders are then heated and compressed to form the CPC structure 10. If present, a soluble neutron absorber preferably makes up from about 8% to about 12% by weight of the CPC structure, and more preferably about 10% by weight of the CPC structure.

Figure 2:
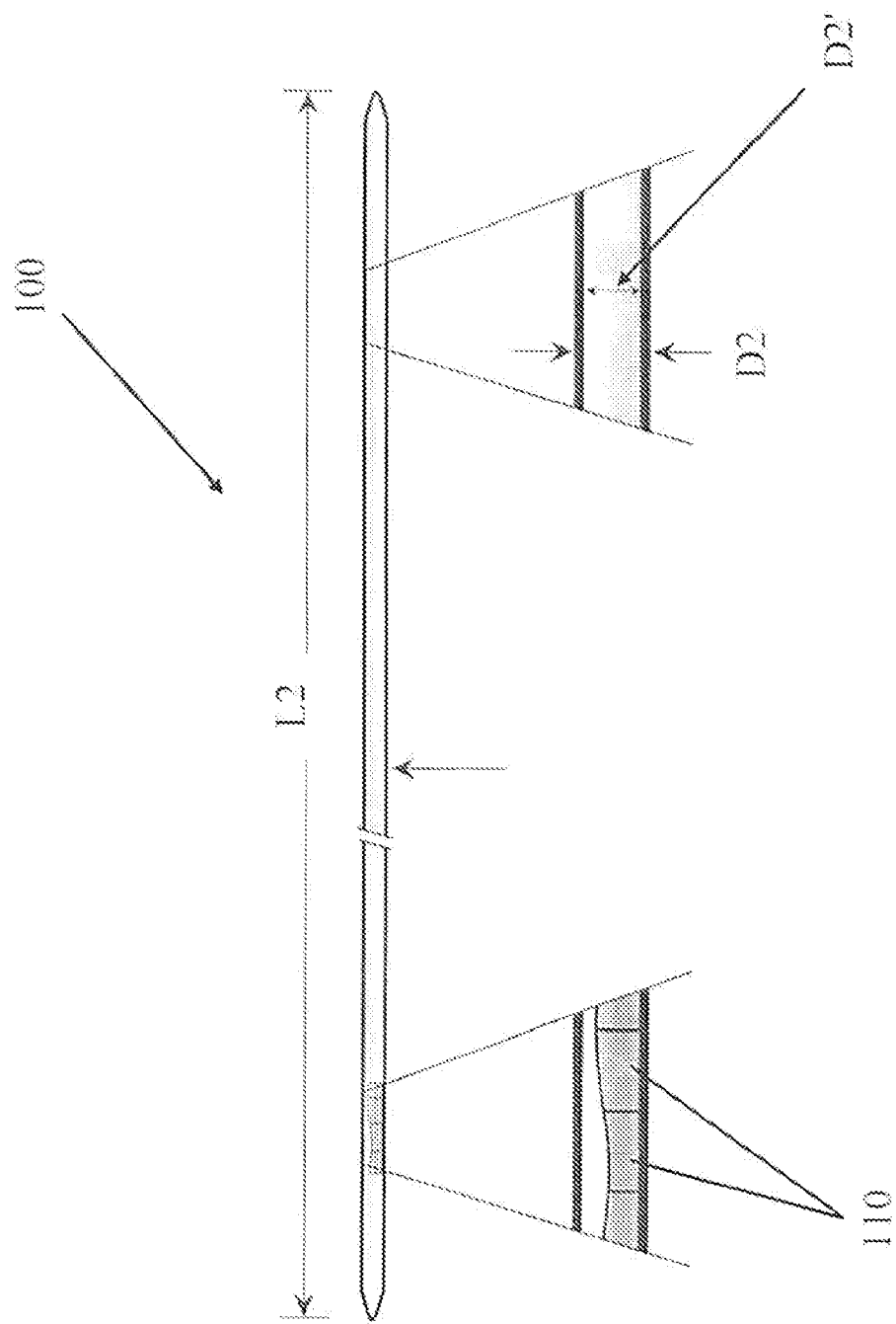
FIG. 2 shows a typical stacking arrangement for CPC pellets in a hollow stainless steel or Zircaloy tube.

FIG. 2 shows a tube 100 including CPC material in the form of CPC pellets 110 stacked therein. The CPC pellets 110 are substantially identical to the CPC structure 10 shown in FIG. 1. The tube 100 (or "absorber tube" to distinguish it from guide tubes discussed later) in which the CPC pellets 110 are located is typically made of stainless steel, one or more zirconium alloys (such as, for example, Zircaloy-1, Zircaloy-2, or Zircaloy-4), or other similar metal and typically has a length L2, an outside diameter D2, and an inside diameter D2'. The length L2 may vary based upon the active fuel length within a spent fuel assembly to be protected. More specifically, the length L2 may vary from approximately 5 feet (1.5 m) to approximately 13 feet (4 m). The external diameter D2 is typically sized based upon the internal dimension of individual spent fuel assembly guide tubes. Typical external diameter D2 dimensions range from about 0.6 inches (15.2 mm) to about 0.9 inches (22.9 mm). The internal diameter D2' is selected to ensure that the formed pellets can be stacked within the tube 100 with close clearance. Close clearance ensures that free movement that could lead to damage to the pellets is reduced or precluded. The internal diameter D2' will preferably exceed the diameter of the pellet 110 by approximately 2 mm.

The tube 100 is preferably sealed at both ends to retain the pellets 110, which are stacked within the tube. Springs or other biasing member may be used at one or both ends of the tube 100 internally to maintain a compressive force on the pellets 110 to maintain their close spatial relationship within the tube 100, and to preclude gaps along the stack of pellets 110. The sealed ends of the tube 100 also preclude the free entry of water or other material, although exposure to water, for example, in the storage, transport and disposal environments would have no detrimental effect on the pellets 110. One end of the tube is preferably machined to adapt to a fixture that secures one or more tubes 100 in a regular array. The compressed pellets themselves have sufficient integrity to allow handling, stacking, and other similar mechanical operations to get them into position within, for example, an absorber tube, but beyond such basic mechanical stresses, the pellets do not need structural strength or capability. For example, individual pellets are not clad with another metal.

The tube 100, its geometry and attachment configuration may be similar to control rods typically used for criticality control in nuclear reactors for criticality control using Pressurized Water Reactor (PWR) nuclear fuel. PWR nuclear fuel is designed with an internal arrangement of guide tubes, which are used to allow the insertion of (criticality) control rods in order to control the power output of a nuclear reactor. Full insertion of such control rods into the guide tubes during normal operation of a nuclear reactor should, by design, stop the nuclear reaction that is occurring in the reactor. Embodiments of this disclosure take advantage of the existence of the guide tube positions so that these strategic positions may be used to receive tubes (e.g., the tube 100) holding CPC pellets stacked therein. The neutron absorbing materials used in guide tubes in a reactor during normal operation include alloys, organics and other materials not suitable for use in disposal because of known failure modes and/or chemical actions that, after a long period, could lead to loss of criticality control. Consequently, embodiments presented in this disclosure are intended to replace contemporary neutron absorbing material with the CPC structure 10 and similar CPC material that is suitable and desirable for spent fuel disposal.

Embodiments described herein may completely eliminate the need for borated stainless steel neutron absorber plates and flux traps that are contemplated for contemporary TAD structure designs. By eliminating these features of contemporary TAD structure designs, an increase in storage capacity of three or more additional spent fuel assemblies is made possible (e.g., increasing the capacity of the current typical TAD design from twenty-one spent fuel assemblies to twenty-four spent fuel assemblies).

Figure 3:
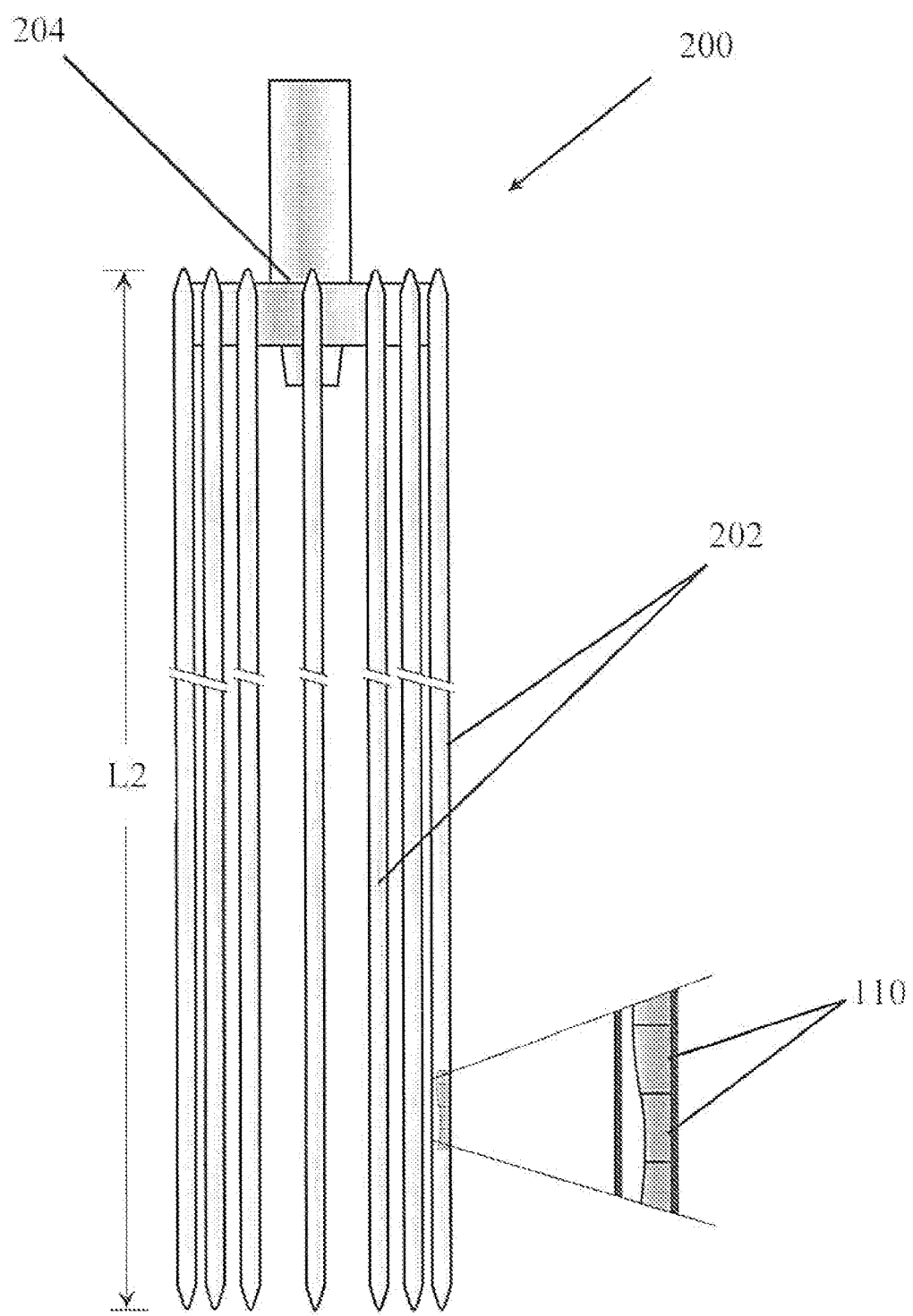
FIG. 3 shows a typical arrangement of CPC tubes for insertion in spent fuel assembly control rod positions.

FIG. 3 shows an arrangement 200 of a plurality of tubes 202 together with a fixture 204 that is suitable to allow single operation insertion or removal of one or more tubes 202 simultaneously. In a preferred embodiment, this fixture arrangement, sometimes referred to as a "spider," may be readily adapted to incorporate the CPC material for spent fuel disposal wherein, for example, tubes 202 are similar or identical to tube 100. Use of such a standard fixture 204 is preferred since there is large body of experience and knowledge associated with the handling and use of control rod spider assemblies and their use for criticality control is integral to the training and work of nuclear reactor operators.

The configuration depicted in FIG. 3 is designed and fabricated so that it may be inserted in the guide tubes of a spent fuel assembly that is being prepared for disposal. In normal operations, a given storage or disposal canister would contain a substantial number of spent fuel assemblies which would be arranged in a regular array within a basket. In a preferred embodiment of this disclosure, some or all of the spent fuel assemblies, as determined by analysis, are designated to hold CPC spider assemblies. Once loaded into the designated spent fuel assemblies, a storage or disposal canister is preferably sealed, locking the spider assemblies and spent fuel assemblies in place.

Once closed, the spent fuel disposal canister or basket remains in a subcritical state because of the presence of the CPC material contained within the tubes of the spider. Over tens of thousands of years, the spent fuel has the potential for dissolution in groundwater. This process, which presumes the dissolution of spent fuel, is the long term effect of corrosion from groundwater in a repository on multiple barriers that protect the spent fuel. First, the outer portions of a TAD overpack will be exposed to groundwater, which may corrode and degrade and expose the TAD outer shell. The TAD outer shell may corrode and degrade, allowing groundwater to ingress into the TAD structure and contents stored therein, thereby allowing the enclosed spent fuel to be exposed to groundwater. The cladding of the spent fuel (typically a Zircaloy) may have failed by this time, or may corrode and fail in presence of the groundwater. Over time, a limited amount of the spent fuel may slowly dissolve into surrounding groundwater. In these events, the subcritical condition of the fuel is assured since the CPC material has an extremely slow corrosion rate compared to the spent fuel and because the CPC material is substantially insoluble. In addition, the material does not contain an alloy or organic materials that can be attacked by solvent, including water, leading to the failure of the criticality control features due to corrosion.

Figure 4:
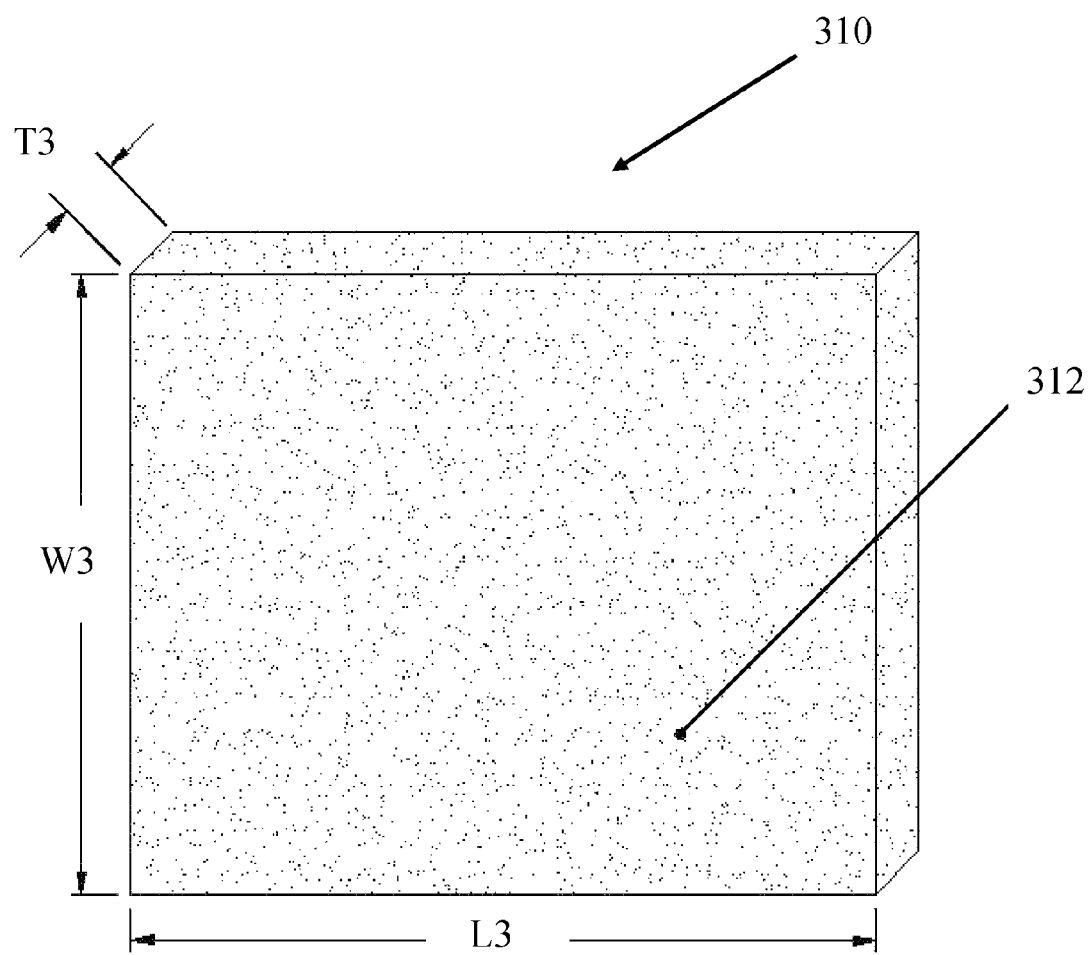
FIG. 4 shows a CPC structure in the shape of a planar structure (e.g., a plate).

FIG. 4 shows an embodiment of a CPC structure in the form of a plate 310, for absorbing neutrons and preventing the initiation of a neutron chain reaction. The plate 310 includes CPC material 312 made from a mixture of a soluble neutron absorber, an insoluble neutron absorber, and a nickel matrix material. The plate 310 includes a length L3, a width W3, and a thickness T3. The length L3 typically ranges from about 12 feet to about 14 feet, and the width W3 typically ranges from about 5.5 inches to 8.8 about inches, depending on the fuel type. The thickness T3 typically ranges from about 0.1 inches to about 0.5 inches and most preferably is about 0.4 inches.

The nickel matrix material, soluble neutron absorber, and insoluble neutron absorber forming all or part of the plate 310 are preferably particulates or powders formed into the substantially single solid mass using heat and compression processes such as those described herein.

The soluble neutron absorber preferably includes boron oxide ($B_2O_3$) or other similar soluble neutron absorber. The insoluble neutron absorbing material preferably includes boron carbide ($B_4C$) and/or gadolinium phosphate ($GdPO_4$). For example, if $B_2O_3$ is used as the soluble neutron absorber, the $B_2O_3$ is preferably present in a nominal concentration of about ten weight percent (10 wt %) of the total mixture. If $B_4C$ is used as the insoluble neutron absorber, the $B_4C$ is preferably present in a nominal concentration of about five weight percent (5 wt %) of the total mixture. These quantities may be tailored depending on the design requirements of a particular application, based on the initial enrichment of the SNF and the arrangement of the SNF in an SNF containment structure or basket.

In a related embodiment, the plate 310 is formed from an insoluble neutron absorber powder and a metal powder with substantially very little or substantially no soluble neutron absorber powder. The insoluble neutron absorbing material preferably includes boron carbide ($B_4C$) and/or gadolinium phosphate ($GdPO_4$). If $B_4C$ is used as the insoluble neutron absorber, the $B_4C$ is preferably present in a nominal concentration of about five weight percent (5 wt %) of the total mixture.

Figure 5:
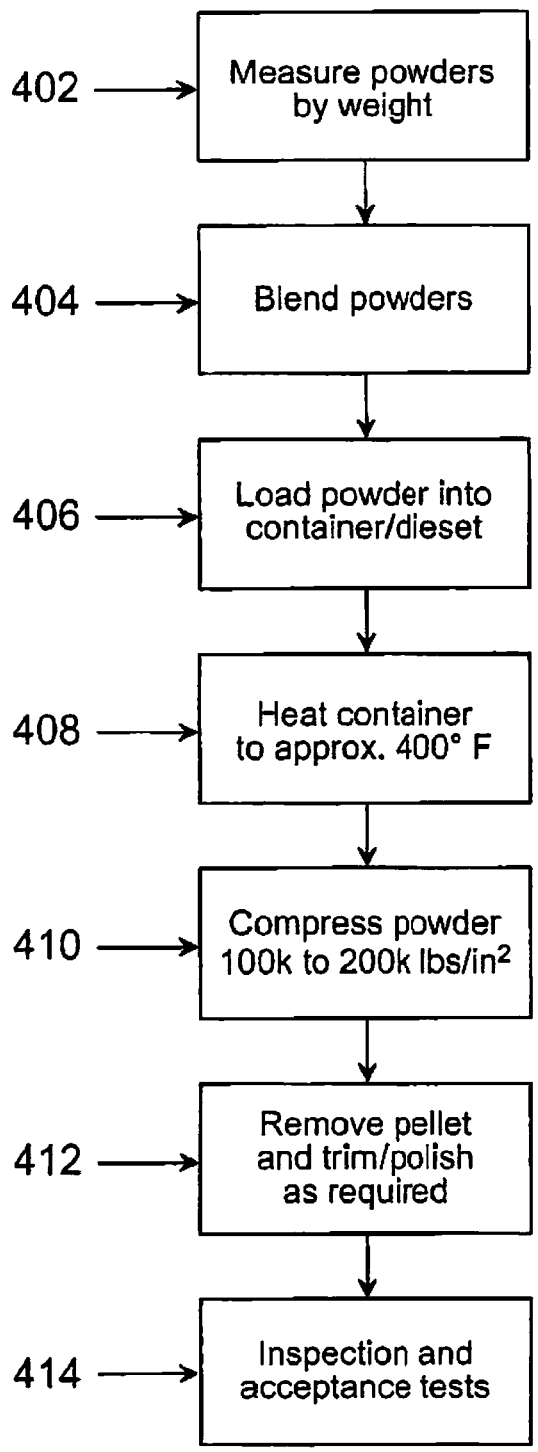
FIG. 5 shows a flowchart of the typical steps of a method of making a CPC neutron absorbing material in pellet form.

FIG. 5 shows steps of an embodiment of a method for making a CPC pellet such as CPC structure 10. The steps preferably include measuring 402 a first amount of a soluble neutron absorbing powder (preferably by weight), and a second amount of a nickel metal powder material; blending 404 the neutron absorbing material powder and the metal powder to form a substantially uniform first mixture; loading 406 the first mixture into a receiving structure (or "die set"); heating 408 the first mixture to a predetermined temperature ranging from about 350 degrees Fahrenheit to about 450 degrees Fahrenheit, more preferably about 400° F., for a predetermined time period (preferably about 30 seconds); and compressing 410 the first mixture in the die set at a pressure ranging from about 100,000 lbs/in² to about 200,000 lbs/in², more preferably about 100,000 lbs/in², for a selected time period (preferably about 30 seconds) to bring the first mixture to a desired pellet thickness (e.g., the structure 10 length L1). Optionally, the formed pellet is removed from the die set and 412 trimmed and/or polished as required. A final optional step 414 includes performing inspection and acceptance testing on the finished pellet. It is anticipated that one or more of these steps are accomplished via automated processes using automated processing machinery.

The compression pressure, temperature, and selected times for both heating and compression are carefully selected to cause substantially complete mechanical bonding of the metal and neutron absorber materials to form a compressed powder composite without causing the metal and the neutron absorbing material to chemically react, forming undesirable alloy products. A slight amount of porosity remains, as the process must be controlled to preclude the formation of such alloy products. As discussed above, such alloy products are highly corrosive compared to the mechanically bonded CPC structure 10.

The heating step 408 may be performed using an oven or any other similar heating methods known to a person having ordinary skill in the art. The pressing or compression step 410 is preferably performed using a hydraulic press, wherein the rate of compression is controlled to reduce, if not preclude, the amount of powder that escapes the press die set with air that is displaced by the press. Preferably, only one compression pass is made. In one embodiment, the heating step 408 and the compression step 410 occur substantially simultaneously.

The embodiments described herein are considered unique in part because the non-alloyed product substantially retains the properties of the base metals and chemical compounds. To achieve this desired result, the manufacturing process must be controlled to ensure that the nickel and neutron absorber powder(s) are mechanically joined yet retain their distinct properties. Under high pressure and high heat conditions, the nickel and boron carbide can react to form a nickel boron alloy and free carbon as shown in Equation 1 below. In this condition, the $Ni_2B$ can be subject to intergranular attack, resulting in a significant lessening of corrosion resistance. Thus, the temperatures and pressures of manufacture are specific and limited, and care must be taken to avoid temperatures and pressures that are above those disclosed herein.

$$Ni+B_4C \rightarrow Ni_2B+C \qquad \text{Equation 1}$$

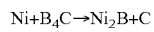

A unique advantage of the compressed powder composite described herein is that it retains its characteristic resistance to corrosion. Because all of the intended included materials have very high corrosion resistance, the included materials are not subject to failure modes associated with alloys and chemical compounds formed when such included materials chemically react with one another. Therefore, because the included materials do not chemically react but merely mechanically bond to one another as described herein, all of the included materials remain substantially insoluble even after the CPC material is formed.

The foregoing description of preferred embodiments for this invention has been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for absorbing neutrons emitted from spent nuclear fuel comprising a compressed powder composite (CPC) material in the form of a pellet including dendritic nickel powder and neutron absorbing material powder being substantially mixed together and mechanically bonded together but not chemically bonded together so that the respective corrosion rates of the nickel and neutron absorbing material making up the CPC material remain substantially unchanged, wherein the neutron absorbing material comprises a chemical species selected from the group consisting of gadolinium phosphate, boron carbide, and mixtures thereof.

2. The apparatus of claim 1 wherein the CPC material includes a concentration of neutron absorber material by mass ranging from about 10% to about 3%.

3. The apparatus of claim 1 wherein the CPC material is shaped in the form of a cylindrical pellet.

4. The apparatus of claim 3 wherein said cylindrical pellet includes a length ranging from about 0.5 inches to about 0.9 inches, and a diameter ranging from about 0.3 inches to about 0.5 inches.

5. The apparatus of claim 1 wherein the compressed nickel powder consists of substantially pure dendritic nickel.

6. The apparatus of claim 3 wherein the cylindrical pellet is located within a substantially sealed elongate tube having a length ranging from about 5 feet to about 13 feet.

7. The apparatus of claim 4 further comprising a plurality of the cylindrical pellets located in a stacked configuration within an absorber tube, wherein the absorber tube has a length ranging from about 5 feet to about 13 feet and wherein the absorber tube length and diameter is sized for fitting within a guide tube of a Pressurized Water Reactor spent nuclear fuel assembly.

8. The apparatus of claim 6 wherein the absorber tube is made from a metal selected from the group consisting of stainless steel and one or more zirconium alloys.

9. The apparatus of claim 1 wherein no alloy of boron and dentritic nickel is formed during the manufacturing process.

\* \* \* \* \*